(12) United States Patent
Leininger et al.

(10) Patent No.: US 8,748,562 B2
(45) Date of Patent: Jun. 10, 2014

(54) PROCESS FOR PREPARING HIGH MOLECULAR WEIGHT POLYESTERS

(75) Inventors: Larry W. Leininger, Akron, PA (US); Dong Tian, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 1225 days.

(21) Appl. No.: 11/906,467

(22) Filed: Mar. 4, 2008

(65) Prior Publication Data

US 2008/0227951 A1    Sep. 18, 2008

(51) Int. Cl.
*C08G 63/00* (2006.01)

(52) U.S. Cl.
USPC ..... 528/308.3; 528/272; 528/275; 528/308.1; 528/308.2; 528/480; 528/483; 528/501; 528/502 R; 528/503; 422/176; 422/604

(58) Field of Classification Search
USPC .......... 528/271–308.3, 480, 481, 501, 502 R, 528/503; 422/129, 131, 135, 136, 137, 164, 422/176, 604
See application file for complete search history.

(56) References Cited

U.S. PATENT DOCUMENTS

| | | | |
|---|---|---|---|
| 3,054,776 A * | 9/1962 | Higgins | 526/65 |
| 3,551,386 A | 12/1970 | Berkau et al. | |
| 3,585,259 A | 6/1971 | Lefferts et al. | 264/50 |
| 4,127,560 A | 11/1978 | Kramer | 528/273 |
| 4,289,871 A * | 9/1981 | Rowan et al. | 528/308.3 |
| 4,468,499 A | 8/1984 | Siegfried et al. | 525/301 |
| 5,198,530 A * | 3/1993 | Kyber et al. | 528/279 |
| 5,648,032 A | 7/1997 | Nelson et al. | 264/101 |
| 5,663,281 A | 9/1997 | Brugel | 528/272 |
| 5,869,582 A | 2/1999 | Tang et al. | 525/415 |
| 5,980,797 A | 11/1999 | Shelby et al. | 264/85 |
| 2003/0139543 A1* | 7/2003 | Wilhelm et al. | 526/65 |

* cited by examiner

*Primary Examiner* — Frances Tischler
(74) *Attorney, Agent, or Firm* — Michael U. Lee

(57) ABSTRACT

A process for producing higher molecular weight polyester includes heating a polyester to form a melt, and applying and maintaining a vacuum of between about 5 mm and about 85 mm of mercury to the melt while passing bubbles of gas through the melt until molecular weight has increased. The process may involve esterification of a diacid component and a diol component at elevated temperature. After the acid functional groups have essentially reacted, a vacuum of about 5 mm of mercury or less was applied and excess diol stripped off during transesterification, thereby increasing molecular weight.

Figure 1:
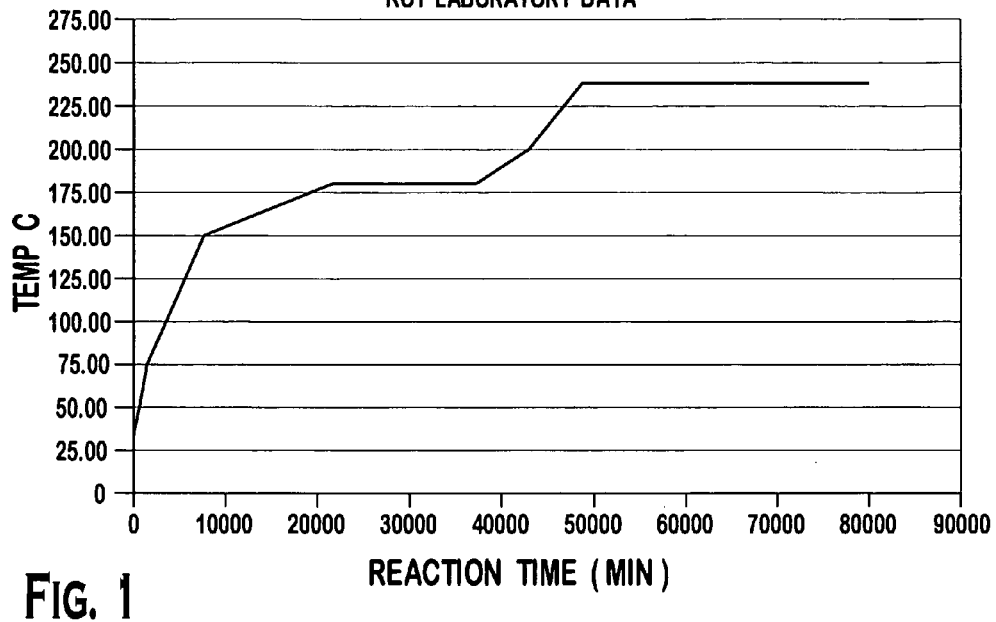

25 Claims, 2 Drawing Sheets

PROCESS FOR PREPARING HIGH MOLECULAR WEIGHT POLYESTERS

BACKGROUND OF THE INVENTION

This invention relates to a process for producing higher molecular weight polyesters.

High molecular weight, crystalline polyesters such as PET (polyethylene terephthalate), PBT (polybutylene terephthalate), PPT (polypropylene terephthalate) have found broad commercial utility including films, fibers, injection molded parts and many others. A wide range of technologies have been developed to achieve the high molecular weight needed for strength properties of these materials.

For Example, PET may be prepared by the direct esterification of terephthalic acid with ethylene glycol. Typically, an excess of ethylene glycol is utilized to react with all the terephthalic acid groups at high temperature. A high vacuum is subsequently applied and transesterification catalyzed for the removal of volatile ethylene glycol and the building of high molecular weight in the molten polymer.

Another method involves the use of dimethyl terephthalate (diester) which is transesterified by reaction with ethylene glycol at high temperature. Once the methanol has been removed, a high vacuum is applied and transesterification catalyzed for the removal of volatile ethylene glycol and the building of high molecular weight.

It is understood by those skilled in the art, that removal of the volatile diol component from the polymer melt during transesterification leads to high molecular weight. High molecular weight may be obtained faster if higher vacuum is utilized. Typically, a high vacuum of less than 5 mm mercury is utilized. Vacuums below 1 mm of mercury are preferred. It is also known that as the melt viscosity increases due to increased molecular weight, the removal of diol becomes more difficult. The increase in molecular weight can become diffusion dependent because of the high viscosity of the molten polyester. This means that the released volatile diol from the transesterification reaction reacts back into the polymer before it can diffuse out of the melt, and be removed. Renewing the surface of the melt can facilitate the loss of diol and increase molecular weight.

Because of the high melt temperature of PET and the above issues, fluidized bed technology for achieving high molecular weight has also been utilized. A PET polymer is prepared using the melt processes described above to produce mid to high molecular weight. The polymer is formed into particles and fluidized in a hot stream of inert gas. The hot gas stream helps remove volatile ethylene glycol and increase molecular weight.

SUMMARY OF THE INVENTION

An object of the invention is to provide a process for producing higher molecular weight polyesters, particularly a process including heating a polyester to form a melt, and applying and maintaining a vacuum of between about 5 mm and about 85 mm of mercury to the melt while passing bubbles of gas through the melt until molecular weight has increased.

BRIEF DESCRIPTION OF THE INVENTION

Figure 2:
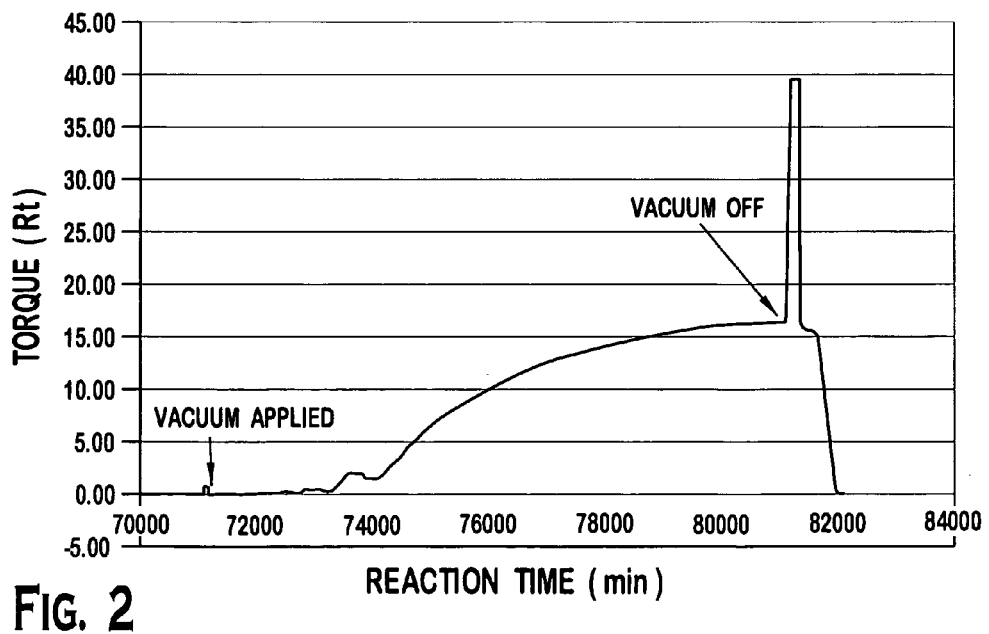
Figure 3:
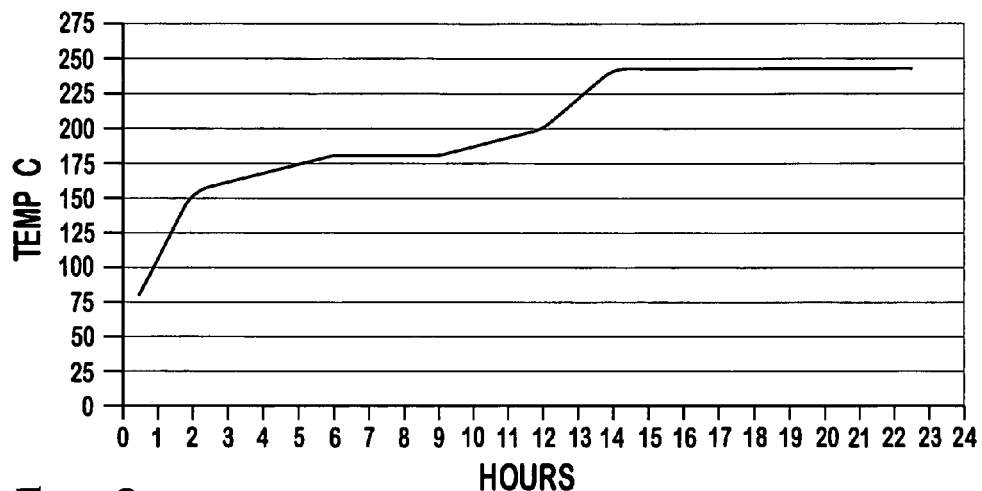
Figure 4:
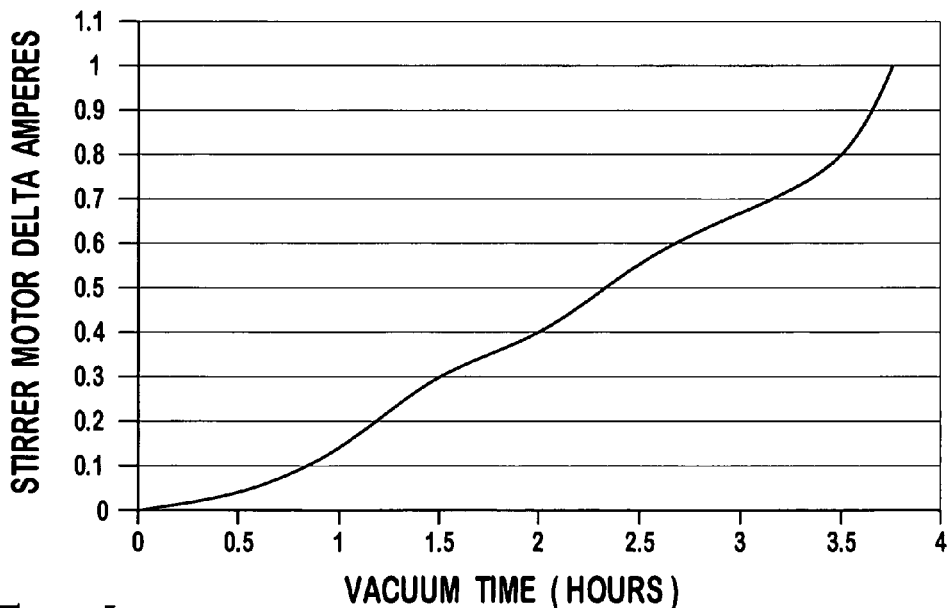

FIG. 1 is a reactor heating/time profile of Example 1.
FIG. 2 is a stirrer torque profile of Example 1.
FIG. 3 is a reactor heating/time profile of Example 3.
FIG. 4 is a stirrer torque amperes profile of Example 3.

DETAILED DESCRIPTION OF THE INVENTION

The method of making high molecular weight polyesters of the present invention involved esterification of a diacid component and a diol component at elevated temperature. Typically, an excess of diol was employed. After the acid functional groups have essentially reacted, a vacuum of about 5 mm of mercury or less was applied and excess diol stripped off during transesterification, thereby increasing molecular weight. We utilized a RC1 stainless steel jacketed reactor vessel with a stainless steel anchor stirring blade (Mettler-Toledo Inc, 1900 Polaris Parkway, Columbus, Ohio). The reactor temperature was computer controlled using, electrically heated or cooled silicon oil circulated through the reactor jacket. The reactor was also equipped with stirrer torque readout, distillation column, nitrogen sparge (dip pipe) and a stainless steel plug valve that sits flush with the bottom of the reactor. The nitrogen sparge was located below the melt surface during the esterification step of the reaction. The nitrogen sparge was stopped when vacuum was applied for transesterification and the building of molecular weight. The increase in polyester molecular weight was monitored by the torque readout.

Stirrer torque is a measurement of power applied to the stirrer motor. The change in torque (delta Rt) for the molten polyester while the reactants are under vacuum was monitored. Chart 1C of Example 1 shows that the delta torque value started at 0 and increased to a value greater than 16 while under vacuum. When the vacuum is shut off the torque jumps to a higher value because any foam collapses thus the viscosity increases.

We have also found that polyester resin can be made by esterification of a diacid and diol at elevated temperature using an excess of diacid. An excess of about 0.01-0.5 mole excess of diacid was typically employed. In one embodiment, a diacid mole excess of 0.1 to 0.3 is preferred. After all the hydroxyl groups are reacted, a high vacuum was applied to build molecular weight. The mechanism by which high molecular weight was achieved is not clear.

We have found that high molecular weight polyesters can be prepared using the direct esterification and transesterification procedures at significantly lower (less) vacuum (above 5 mm of mercury) than that typically utilized for PET and other polyesters. This is particularly true for polyester formulations containing an excess of diacid. Interestingly, we have found that the use of a gas sparge at the bottom of the reactor during the vacuum step assists in making high molecular weight polyesters at lower (less) vacuum. There is some indication that molecular weight may increase faster when air is utilized verse nitrogen. Experiments have shown that the gas bubbling through the melt from the bottom discharge valve is significantly more efficient in achieving high molecular weight than gas bubbling through a dip pipe (gas sparge) below the surface of the melt. The ability to bubble gas near the bottom surface of the reactor vessel and more uniformly throughout the reactor has a significant effect at achieving high molecular weight at relatively low (less) vacuum conditions (above 5 mm of mercury to about 85 mm mercury). In one embodiment the vacuum is preferably from about 25 mm of mercury to about 50 mm of mercury.

EXAMPLE 1

General procedure for Preparation of High Molecular Weight Polyesters Using RC1 Reactor—Low Vacuum Conditions The following formulation (Table 1) was charged to a RC1 stainless steel jacketed reactor vessel with a stainless steel anchor stirring blade (Mettler-Tolcdolnc, 1900 Polaris Parkway, Columbus, Ohio). The reactor temperature was computer controlled using electrically heated or cooled silicon oil circulated through the reactor jacket. The reactor was also equipped with stirrer torque readout, distillation column, nitrogen sparge (dip pipe) and a stainless steel plug valve that sits flush with the bottom of the reactor.

TABLE 1

| Ingredient | EX-1 Amt (g) |
|---|---|
| 1,3-Propanediol | 201.93 |
| 1,4-Cyclohexanedimethanol | 163.97 |
| Isophthalic acid | 396.95 |
| Phthalic anhydride | 151.67 |
| Sebacic acid | 80.50 |
| T-20 Dibutytin bis-lauryl mercaptide | 4.98 |
| | 1000.00 |

The procedure for charging the reactor and making the polyester was as follows:
1. Charge 1,3-propanediol and 1,4-cyclohexanedimethanol, and start the nitrogen sparge (0.2 SCFH) and heat to 80° C.
2. Charge phthalic anhydride, Isophthalic acid, Sebacic acid, and T20 catalyst
3. Begin heating to 150° C. over 1.5 hours
4. Begin heating to 180° C. over 4 hours
5. Hold at 180° C. for 4 hours
6. Begin heating to 205° C. over 2 hours
7. Begin heating to 240° C. over 2 hours
8. Hold at 240° C. for 5.5 hours
9. Stop nitrogen sparge and apply vacuum gradually.
10. Hold under vacuum (25 mm of mercury) for 2.5-3.5 hours or until viscosity reaches target value (monitor torque of stirrer: Delta Rt of >16)
11. Discharge at 240° C. into Teflon lined pans The reactor heating/time profile is shown in FIG. 1, and stirrer torque profile is shown in FIG. 2. The viscosity of the polyester was generally greater than 900,000 cps at 270° F. (132° C.).

EXAMPLE 2

Comparison of Experimental Conditions For Making High Molecular Weight Polyesters at Low Vacuum Conditions

EXAMPLE 2A

The formulation of Table 1A was scaled up to jacketed 100 gallon Blaw-Knox reactor equipped with a stirrer, condenser and nitrogen dip pipe sparge—See Table 2A. The procedure for charging the reactor and making the polyester was as follows:

TABLE 2A

| Ingredient | EX-2A Amt (lbs) |
|---|---|
| 1,3-Propanediol | 171.6 |
| 1,4-Cyclohexanedimethanol | 139.4 |
| Isophthalic acid | 337.4 |
| Phthalic anhydride | 128.9 |
| Sebacic acid | 68.4 |
| T-20 Dibutytin bis-lauryl mercaptide | 4.3 |
| | 850.0 |

100 Gallon Reactor Procedure:
1. Charge 1,3-propanediol and 1,4-cyclohexanedimethanol, and start the nitrogen sparge (0.2 SCFH) and heat to 80° C.
2. Charge phthalic anhydride, Isophthalic acid, Sebacic acid, and T20 catalyst
3. Begin heating to 150° C. over 1.5 hours
4. Begin heating to 180° C. over 4 hours
5. Hold at 180° C. for 4 hours
6. Begin heating to 205° C. over 2 hours
7. Begin heating to 240° C. over 2 hours
8. Hold at 240° C. for 5.5 hours
9. Stop nitrogen sparge and apply vacuum gradually to 30 mm of mercury.
10. After 4 hrs at vacuum, little change in torque was noted—viscosity was 70,000 cps at 270° F. (132° C.) well short of the target. The heating under vacuum was discontinued and the product cooled to room temperature.

In order to determine why molecular weight had not increased, a series of experiments were run using the RC1 reactor vessels and the polyester prepared in the 100 gallon reactor above.

EXAMPLE 2B 1080 grams of EX-2A was charged and melted at 240° C. in a RC1 stainless steel jacketed reactor vessel with a stainless steel anchor stirring blade (Mettler-Toledo Inc, 1900 Polaris Parkway, Columbus, Ohio). The reactor temperature was computer controlled using electrically heated or cooled silicon oil circulated through the reactor jacket. The reactor was also equipped with stirrer torque readout, distillation column, and a stainless steel plug valve that sits flush with the bottom of the reactor. The reactor was also equipped with a standard vacuum pressure dial gauge to measure the vacuum. 6.1 grams of T20 catalyst was charged to the reactor and vacuum applied at 30.0 inches of mercury. After 5 hrs under vacuum a change in delta torque (Rt) of 4.5 units was observed (target was >16). At this point the bottom valve was slightly opened and air was allowed to bubble through the batch and the vacuum reduced to 29.5 inches of mercury. Immediately the change in torque (Rt) began to increase and after 1.7 hrs a total delta Rt of 15.75 was obtained.

EXAMPLE 2C

The RC1 reactor as described above was used in this experiment, except that a standard U-tube vacuum gauge that reads in mm of mercury was inserted parallel with the pressure dial gauge. The U-tube vacuum gauge is more accurate than the pressure dial gauge. Into the RC1 reactor, 1080 grams of EX-2A was charged and melted at 240° C. (no additional catalyst was charged) and a vacuum of 25 mm of mercury (U-tube) was applied. Ambient air was bubbled through the melt from the bottom valve of the reactor. The bubbling of the gas through the melt was controlled to reduced the vacuum (U-tube) to 50 mm of mercury. After 2 hours under vacuum, little change in Rt was noted. At this point, 6 grams of T20 catalyst was charged to the reactor and heating under the 50 mm of mercury vacuum continued. Rt value started to increase immediately. After an additional 2.3 hours the delta Rt was 16.25. Viscosity of the polyester was 1,100,000 cps at 270° F. (132° C.).

EXAMPLE 2D

The same experimental set up as described for 2C was utilized, except that nitrogen was bubbled through the batch from the dip pipe and the delta Rt was 5.90 after the additional 2.7 hours.

EXAMPLE 2E

The same experimental set up as described for 2C was utilized, except that dry was bubbled through the mix under vacuum from the discharge valve at the bottom of the reactor for an additional 2.9 hours and the delta Rt was 16.70. After adding the catalyst as in 2C, the increase in molecular weight was significant as evidenced by the stirrer torque.

EXAMPLE 2F

The same experimental set up as described for 2C was utilized, except that dry nitrogen was bubbled through the mix under vacuum from the discharge valve at the bottom of the reactor for an additional 3.4 hours and the delta Rt was 15.80. After adding the catalyst as in 2C, the increase in molecular weight was significant as evidenced by the stirrer torque.

EXAMPLE 2G

The same experimental set up as described for 2C was utilized, except that dry air was bubbled through the batch from the dip pipe and the delta Rt was 4.60 after the additional 3.7 hours.

Results of all experiments are listed in Table 2B below:

TABLE 2B

RC1 EXPERIMENTS USG EX2A

| Condition | Reaction Temp | Vacuum Time (hr) | Delta Rt with vacuum on | Rt Rate/hr under vacuum |
|---|---|---|---|---|
| Comparative Example RC1 Run Standard Run - No Sparge | 240° C. | 2.6 | 17.25 | 6.63 |
| EX-2B RC1 Data Sep. 5, 2006 Air Sparge Through Bottom Valve | 240° C. | 1.7 | 15.75 | 9.26 |
| EX-2C RC1 Data Sep. 6, 2006 Air Sparge Through Bottom Valve | 240° C. | 2.3 | 16.25 | 7.07 |
| EX-2D RC1 Data Sep. 6, 2006 N2 Sparge Through Dip Pipe | 240° C. | 2.7 | 5.90 | 2.19 |
| EX-2E RC1 Data Sep. 13, 2006 Dry Air Sparge Through Bottom Valve | 240° C. | 2.9 | 16.70 | 5.76 |
| EX-2F RC1 Data Sep. 18, 2006 N2 Sparge Through Bottom Valve | 240° C. | 3.4 | 15.80 | 4.65 |
| EX-2G RC1 Data Sep. 18, 2006 Dry Air Sparge Through Dip Pipe | 240° C. | 3.7 | 4.60 | 9.24 |

Use of air instead of nitrogen leads to less volatiles. However, the use of air yields a darker resin than the use of nitrogen.

EXAMPLE 3

Scale-Up of Experimental Conditions for Making High Molecular Weight Polyesters at Low Vacuum Conditions Using Air Sparge The data from the lab batches in Example 2 were incorporated into a 100 gallon pilot plant batch where an air sparge during vacuum step was incorporated into the process. The formulation of Table 3 was charged to a jacketed 100 gallon Blaw-Knox reactor equipped with a stirrer, condenser, nitrogen dip pipe sparge, and modified bottom discharge valve to allow a measured air sparge during vacuum. The procedure for charging the reactor and making the polyester was as follows:

TABLE 3

| Ingredient | RPa041706-22M1 (R16) Amt (lbs) |
|---|---|
| 1,3-Propanediol | 171.64 |
| 1,4-Cyclohexanedimethanol | 139.38 |
| Isophthalic acid | 337.41 |
| Phthalic anhydride | 128.92 |
| Sebacic acid | 68.43 |
| T-20 Dibutytin bis-lauryl mercaptide | 4.23 |
| | 850.00 |

100 Gallon Reactor Procedure:
1. Charge 1,3-propanediol and 1,4-cyclohexanedimethanol, and start the nitrogen sparge (0.2 SCFH) and heat to 80 C
2. Charge Phthalic anhydride, Isophthalic acid, Sebacic acid, and T20 catalyst
3. Begin heating to 150 C over 1.5 hours
4. Begin heating to 180 C over 4 hours
5. Hold at 180 C for 4 hours
6. Begin heating to 205 C over 2 hours
7. Begin heating to 240 C over 2 hours
8. Hold at 240 C for 5.5 hours
9. Stop nitrogen sparge.
10. Charge 4.23 lbs. T20 catalyst
11. Apply vacuum gradually to 30 mm of mercury 12. Open modified bottom discharge valve to allow 20 SCFH air to enter reactor
13. Monitor viscosity using stirrer motor amp draw.
14. When delta amps are ≤1, close bottom valve, begin N2 sparge, bring reactor back to ambient pressure.
15. Discharge batch at 240 C into Teflon lined pans.

The reactor heating/time profile is shown in FIG. 3, and stirrer torque/amps profile is shown in FIG. 4. The viscosity of the polyester was >2,000,000 cps at 270F.

The invention claimed is:

1. A process for producing a higher molecular weight polyester comprising:
   providing a stirred tank reactor vessel;
   heating a polyester in the stirred tank reactor vessel to form a melt;
   adding a catalyst to the stirred tank reactor vessel; and
   applying and maintaining a vacuum of between about 5 mm and about 85 mm of mercury to the melt contained in the stirred tank reactor vessel while passing bubbles of gas through the melt until molecular weight has increased, wherein the bubbles of gas are introduced to the melt from near the bottom of the melt.

2. The process of claim 1, wherein the vacuum is between about 25 mm and 50 mm of mercury.

3. The process of claim 1, wherein the melt viscosity is monitored as the gas bubbles pass through the melt.

4. The process of claim 3, wherein the process is stopped when the polyester attains a target melt viscosity, 5. The process of claim 3, wherein the melt viscosity is monitored with a melt viscosity monitoring device comprising a stirrer equipped with a torque readout.

6. The process of claim 4, therein the target melt viscosity is a delta torque value.

7. The process of claim 1, wherein the gas is ambient air.

8. The process of claim 1, wherein the gas is nitrogen.

9. The process of claim 1, wherein the gas is dry air.

10. The process of claim 6, wherein the delta torque is greater than 10.

11. The process of claim 10, wherein the delta torque is greater than 15.

12. The process of claim 1, wherein the melt comprises a polyester comprising a diacid component and a diol component.

13. The process of claim 12, wherein the melt comprises a polyester comprising a slight mole excess of the diacid component.

14. The process of claim 1, wherein the melt comprises a polyester comprising a diacid component, a diester component and a diol component.

15. A process for producing a higher molecular weight polyester comprising:
   providing a stirred tank reactor vessel;
   heating a polyester in the stirred tank reactor vessel to form a melt; and
   applying and maintaining a vacuum of between about 5 mm and about 85 mm of mercury to the melt contained in the stirred tank reactor vessel while passing bubbles of ambient air through the melt until molecular weight has increased, wherein the bubbles of ambient air are introduced to the melt from near the bottom of the melt.

16. The process of claim 15, wherein the vacuum is between about 25 mm and 50 mm of mercury.

17. The process of claim 15, wherein the melt viscosity is monitored as the ambient air bubbles pass through the melt.

18. The process of claim 15, wherein the process is stopped when the polyester attains a target melt viscosity.

19. The process of claim 15, wherein the melt viscosity is monitored with a melt viscosity monitoring device comprising a stirrer equipped with a torque readout.

20. The process of claim 19, therein the target melt viscosity is a delta torque value.

21. The process of claim 15, wherein the melt comprises a polyester comprising a diacid component and a diol component.

22. The process of claim 15, wherein the melt comprises a polyester comprising a slight mole excess of the diacid component.

23. The process of claim 15, wherein the melt comprises a polyester comprising a diacid component, a diester component and a diol component.

24. The process of claim 1, wherein the stirred tank reactor vessel holds 100 gallons.

25. The process of claim 15, wherein the stirred tank reactor vessel holds 100 gallons.

* * * * *